United States Patent [19]
Tobias

[11] Patent Number: 5,678,711
[45] Date of Patent: Oct. 21, 1997

[54] PREFORM AND HOT-FILL BLOW-MOLDED CONTAINER HAVING REINFORCED FINISH

[75] Inventor: John W. Tobias, Lancaster, Pa.

[73] Assignee: Graham Packaging Corporation, York, Pa.

[21] Appl. No.: 611,596

[22] Filed: Mar. 8, 1996

[51] Int. Cl.⁶ .............................. B65D 1/02; B65D 1/46; B65D 1/48
[52] U.S. Cl. .............................. 215/42; 215/44
[58] Field of Search .............................. 215/40, 42–45

[56] References Cited

U.S. PATENT DOCUMENTS

| | | | |
|---|---|---|---|
| 1,720,888 | 7/1929 | Edelmuth | 215/42 |
| 1,941,632 | 1/1934 | Staniland | 215/42 |
| 2,854,163 | 9/1958 | Barnby | 215/40 |
| 3,343,579 | 9/1967 | Clark . | |
| 3,744,656 | 7/1973 | Wolfram | 215/42 |
| 3,804,139 | 4/1974 | Kimm . | |
| 3,869,056 | 3/1975 | Valyi | 215/40 X |
| 3,899,096 | 8/1975 | Marco . | |
| 3,942,660 | 3/1976 | Paller | 215/45 |
| 4,079,851 | 3/1978 | Valyi | 215/40 X |
| 4,341,317 | 7/1982 | Suzuki et al. | 215/42 |
| 4,606,470 | 8/1986 | Barlics | 215/45 X |
| 4,715,504 | 12/1987 | Chang et al. | 215/42 |
| 4,847,129 | 7/1989 | Collette et al. | 215/40 X |
| 4,928,335 | 5/1990 | Collette et al. | 215/42 |

FOREIGN PATENT DOCUMENTS

| | | | |
|---|---|---|---|
| 144450 | 6/1985 | European Pat. Off. | 215/40 |
| 415109 | 3/1991 | European Pat. Off. | 215/40 |
| 308863 | 10/1995 | Switzerland | 215/44 |
| 987 | of 1994 | United Kingdom | 215/44 |

Primary Examiner—Sue A. Weaver
Attorney, Agent, or Firm—Howson and Howson

[57] ABSTRACT

A reinforced finish is on a blow-molded container. An insert is permanently attached on the finish of a preform from which the container is blown, or directly on the finish of the blow-molded container. The insert is ring-shaped, forms a portion of the top surface of the finish, is made from a rigid plastic material, and is positioned entirely above the threads.

16 Claims, 2 Drawing Sheets

PREFORM AND HOT-FILL BLOW-MOLDED CONTAINER HAVING REINFORCED FINISH

FIELD OF THE INVENTION

The present invention relates to plastic blow-molded containers utilized in beverage hot-fill processes, and more particularly to a container having a reinforced finish capable of maintaining stability during and after hot-filling.

BACKGROUND OF THE INVENTION

Plastic blow-molded containers are commonly used to package consumer beverages, such as fruit juices. These containers are usually made from polyethylene terephythalate (PET) and range in size from about 20 ounces to about one gallon. The empty containers are filled with the beverage at the fill site utilizing high speed, automated hot-fill equipment. The beverages are charged into the containers at an elevated temperature to ensure sterility.

A problem associated with plastic PET blow-molded containers when hot-filled is that the amorphous PET finish on the container is vulnerable to distortion at relatively high product fill temperatures. For instance, at hot-fill temperatures of above 185° F., or in situations where unplanned line stoppage occurs resulting in an extended period of time between filling and capping, the finish may become thermally unstable resulting in ovalizing of the finish and creating capping and leakage problems.

These problems have been addressed in some commercial PET hot-fill containers by employing an additional manufacturing step of totally crystallizing the neck finish of the preform to provide dimensional stability. The additional crystallization step increases the manufacturing cost of the containers and preforms, and slows down the speed of the injection molding process used to manufacture the preforms.

Other known attempts to reinforce the finish of a container or preform are discussed in previously issued patents. U.S. Pat. No. 4,847,129 issued to Collette et al. discloses a preform having a multi-layer laminated finish with an outer layer of PET and a core formed of high Tg polymer. U.S. Pat. Nos. 4,341,317 issued to Suzuki et al.; 4,715,504 issued to Chang et al.; 3,744,656 issued to Wolfram; 3,804,139 issued to Kimm; 3,899,096 issued to Marco; and 3,343,579 issued to Clark disclose separate elements attached to the finish of a container or preform to strengthen the finish.

There are several disadvantages associated with the attachments disclosed in the referenced patents. For instance, most of the attachments are relatively large in size, thereby adding to material cost and providing a less preferred aesthetic appearance. Some of the attachments are snapped into the finish, requiring a locking bead or other locking structure. Most of the connections are not designed to withstand the rigorous conditions encountered during a hot-fill process, and they may not always maintain finish stability, especially at high fill temperatures.

Although various ones of the referenced attempts to provide a container, or preform, with a reinforced finish may function satisfactorily for their intended purposes, there is a need for a blow-molded plastic container having a reinforced finish capable of maintaining finish stability during hot-filling at product fill temperatures approaching 210° F. The preform or container having the reinforced finish should be capable of being manufactured at high speeds and at relatively low cost.

OBJECTS OF THE INVENTION

With the foregoing in mind, a primary object of the present invention is to provide a blow-molded plastic container which can readily receive a cap and create a leak-free seal, even after hot-filling at high product fill temperatures.

Another object of the present invention is to provide reinforcement to the finish of a preform such that the container blown therefrom is capable of maintaining its finish stability during and after hot-filling.

A further object of the present invention is to provide a preform having a low-cost reinforced finish which can be produced at rates that enable the preform injection molding system to operate at full speed.

SUMMARY OF THE INVENTION

More specifically, the present invention provides a preform and blow-molded container having a reinforced finish capable of maintaining stability during and after hot-filling. The finish has top, inner peripheral, and outer peripheral surfaces. The inner peripheral surface defines an inner finish diameter and the outer peripheral surface defines an outer finish diameter. The outer peripheral surface has threads which cooperate with a cap to seal the container.

The improvement comprises an insert which is permanently attached to the finish. The insert is ring shaped; forms a portion of the top surface of the finish; is made from a rigid plastic material; and is positioned entirely above the threads.

BRIEF DESCRIPTION OF THE DRAWINGS

The foregoing and other objects, features and advantages of the present invention should become apparent from the following description when taken in conjunction with the accompanying drawings, wherein.

DESCRIPTION OF THE PREFERRED EMBODIMENT

Figure 1:
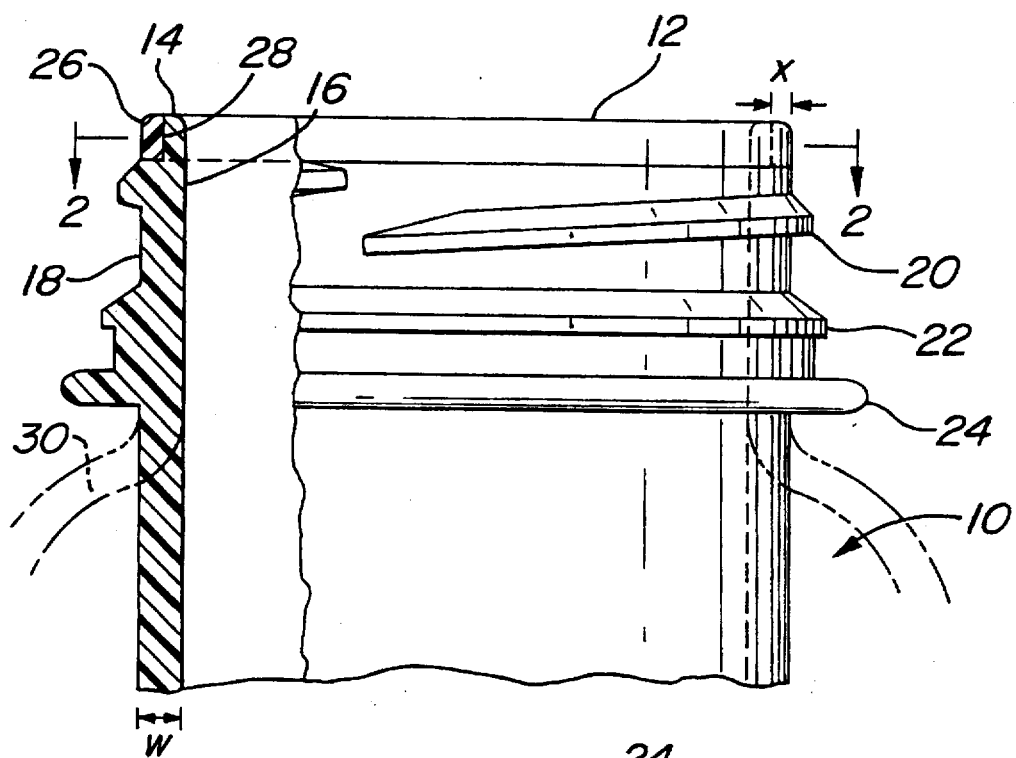
FIG. 1 is a partially cutaway elevational view of a preform, shown in solid lines, and a container, shown in broken lines, having a reinforced finish embodying the invention.

FIG. 1 illustrates a finish 12 of a preform 10 made of PET by injection molding techniques. As well known in the art, the preform 10 is pressurized in the blow molding process to create a blow molded container. The container is then filled with a beverage, capped and transported to market.

The particular preform 10 shown in the drawings is intended for use in an automated, high speed, hot-fill process. Therefore, the container produced from the preform 10 will be subject to product fill temperatures approaching 210° F.

The finish 12 must maintain its stability during the hot-fill process and withstand the stress and strain created by the high temperatures, as well as during handling after the hot-filling. The finish 12 must be able to maintain a circular, cross-sectional shape and be capable of receiving a cap (not shown) to seal the container effectively. A finish which ovalizes to the extent such that it cannot receive the cap, or which does not create an effective seal with the cap is unsatisfactory.

The finish 12 has many common features with a standard finish. The finish 12 has a top surface 14 which engages the underside of a cap (not shown) for purposes of sealing the container. The finish 12 has an inner peripheral surface 16 defining an inner finish diameter "A". The finish 12 has an outer peripheral surface 18 defining an outer finish diameter "B". The distance between the inner peripheral surface 16 and the outer peripheral surface 18 define a width "W" of the finish 12.

Other common features of the finish 12 which aid in sealing the cap to the container are threads 20, an upper annular flange 22, and a lower annular flange 24. The threads 20 cooperate with matching threads (not shown) on the cap to retain the cap to the container. Many known caps are provided with an annular tear strip (not shown) which ensures that there has been no tampering of the contents of the container. The upper annular flange 22 provides a seat for the cap and a score location between the cap and the tear strip. The lower annular flange 24 cooperates with the upper annular flange 22 to lock the tear strip therebetween. The lower annular flange 24 generally extends further outward than the upper annular flange 22 to provide ready manipulation of the preforms 10 by machinery.

According to the present invention, the improved finish 12 has an insert 26 which reinforces the finish 12 so that the finish 12 can maintain its stability during and after hot-fill processing. To this end, the insert 26 is ring-shaped, having an inner diameter "C", an outer diameter "D", and a width "X" as shown in the drawings. The insert 26 is made from a rigid deformation-resistant plastic material which remains stable at temperatures encountered during high temperature product fill processing and which does not ovalize at these temperatures. Examples of suitable plastic materials include crystallized PET, polycarbonate, U-Polymer (eg. polyarylate or polyarylate/PET alloy), and other equivalent plastic materials known in the art.

The insert 26 provides stability to the finish 12 which would otherwise consist of amorphous PET and be vulnerable to deformation due to high temperature hot-fill processing. As stated above, it is known in the art to utilize an expensive secondary step to crystallize the entire neck of a PET preform to provide thermal stability to the finish. The present invention eliminates the need for this expensive secondary step by utilizing a separately prepared insert 26 made of, for instance, crystallized PET, to provide the needed rigidity to the finish 12. The insert 26 is sufficiently rigid to prevent distortion of its own ring shape as well as prevent distortion of the entire finish to which it is applied. In addition, the size of the insert 26 is small relative to the overall size of the finish 12. The small size of the more expensive rigid plastic material, aids in minimizing the cost of reinforcing the finish 12.

Preferably, the insert 26 is permanently attached to the finish 12 on the preform 10. The insert application operation can be separate from the preform injection molding operation, thus allowing the preform injection molding operation to operate at customary speeds. Alternatively, the insert 26 can be permanently attached to the finish 12 on a fully blown container 30, shown in FIG. 1 with broken lines, but this is less desirable from a production standpoint.

Figure 3:
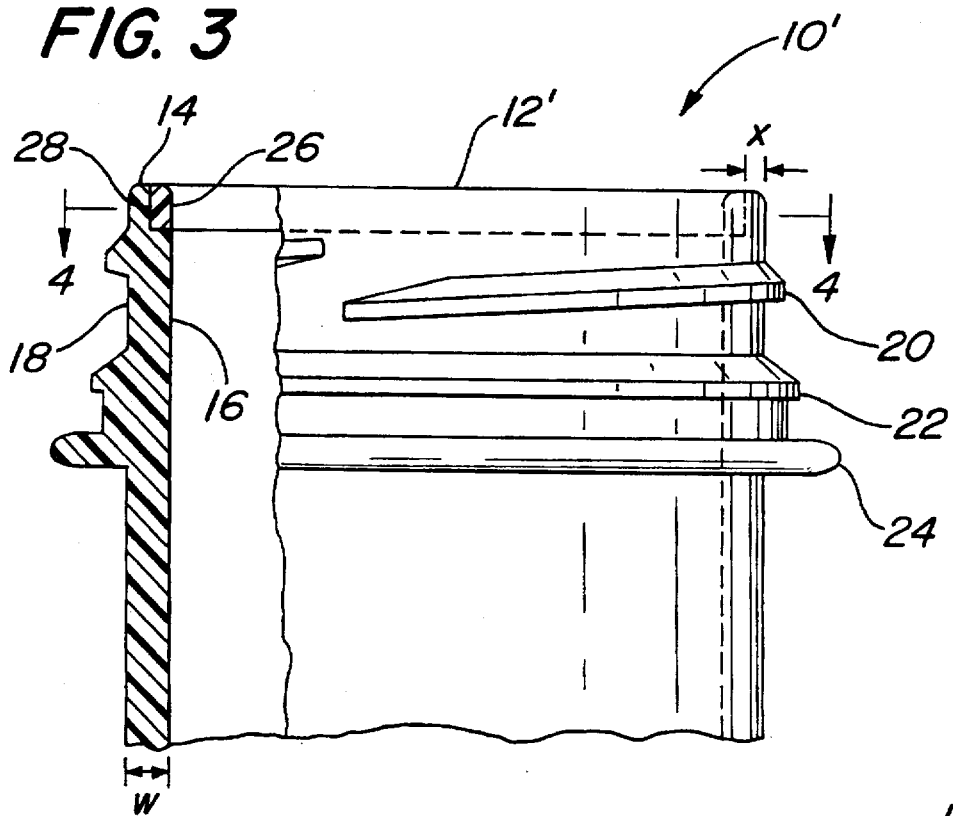
FIG. 3 is a partially cutaway elevational view of an alternate embodiment of a preform having a reinforced finish embodying the invention.

The insert 26 is attached to the finish 12 in a novel manner. As shown in FIG. 1 and 3, the insert 26 forms a portion of the top surface 14 of the finish, and the insert 26 is appropriately sized so that it is positioned in the finish 12 entirely above the threads 20. The advantage of this relationship is that finish stability is maintained without incurring undue cost of either attaching a whole mouthpiece, or attaching a large insert which has an effect on the threads and seal of the container, or embedding an insert, or otherwise using a relatively large amount of material in the insert. The location of the insert 26 on the finish 12 affords ready attachment while providing superior stability.

Figure 2:
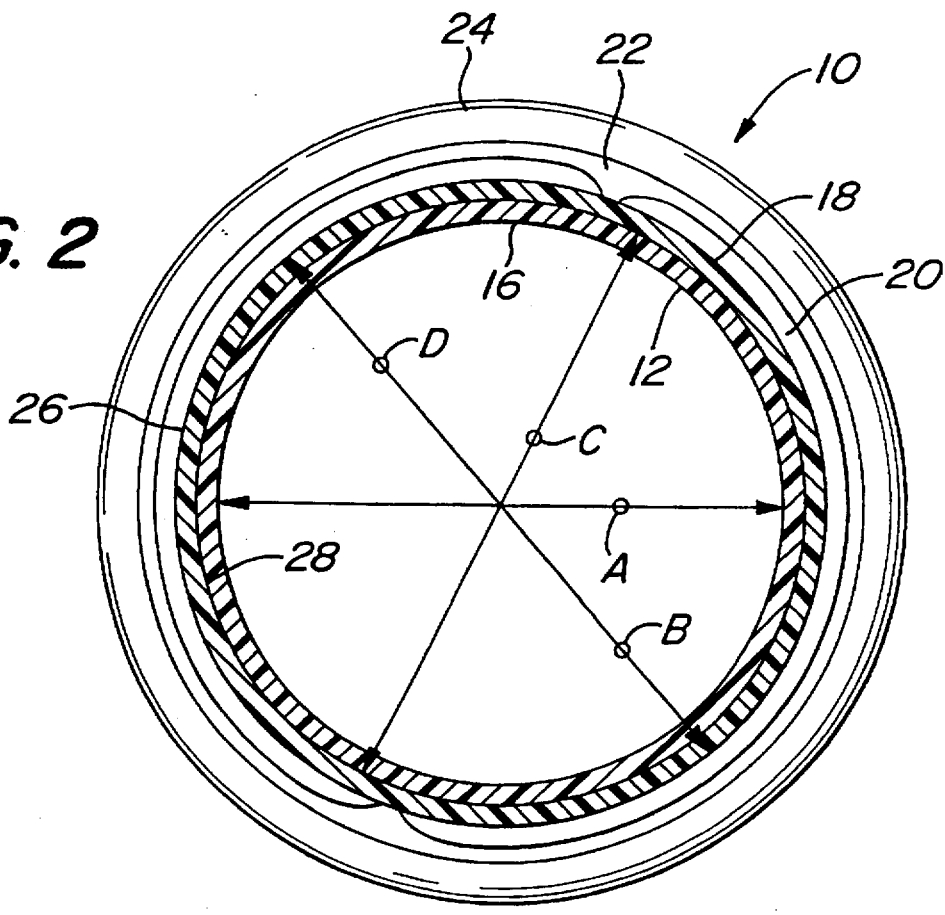
FIG. 2 is a sectional view taken on line 2—2 of FIG. 1.
Figure 4:
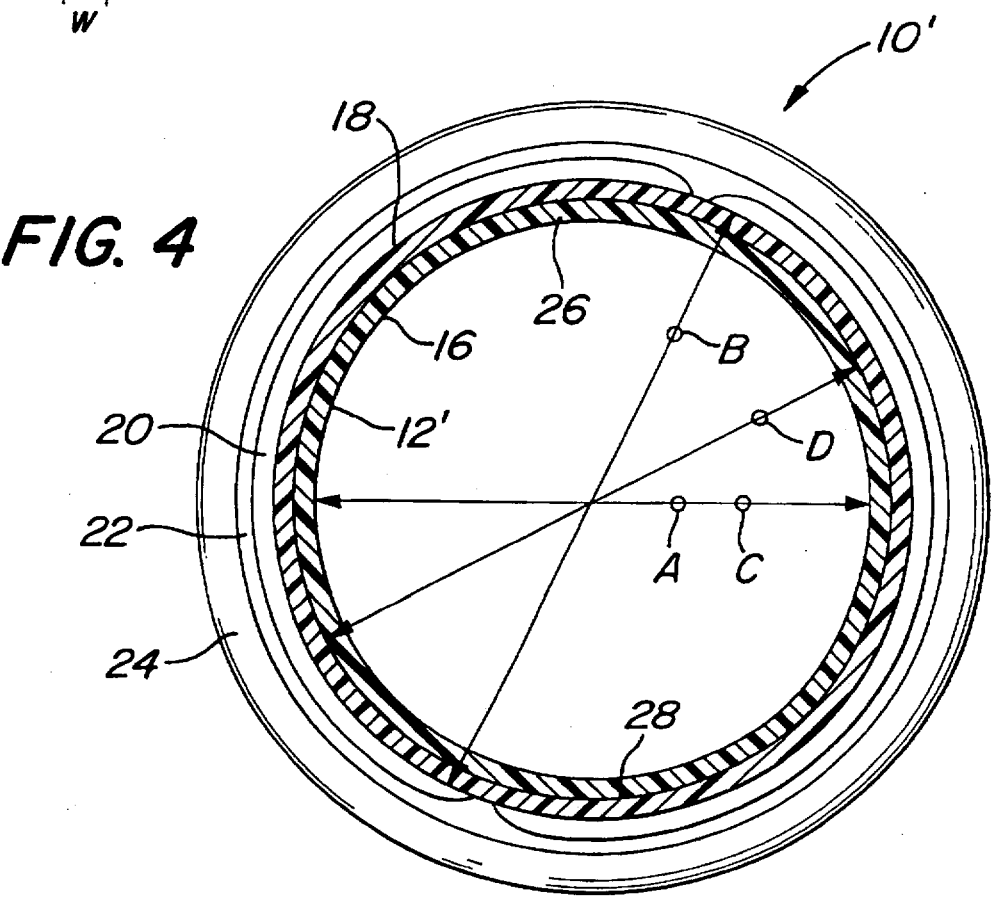
FIG. 4 is a sectional view taken on line 4—4 of FIG. 3.

The relationship of the size of the insert 26 with respect to the size of the finish 12 is another important aspect of the present invention. As shown in FIGS. 2 and 4, the inner diameter "C" of the insert 26 is at least as large as the inner finish diameter "A". Likewise, the outer diameter "D" of the insert 26 is no greater than the outer finish diameter "B". Preferably, the width "X" of the insert 26 is less than the width "W" of the finish 12.

The two embodiments shown in the drawings depict differently sized inserts 26. One embodiment shown in FIGS. 1 and 2 uses an insert 26 appropriately sized to form a portion of the inner peripheral surface 16 of the finish 12. In this case, the inner diameter "C" of the insert 26 matches the inner finish diameter "A". Another embodiment shown in FIGS. 3 and 4 uses an insert 26 appropriately sized to form a portion of the outer peripheral surface 18 of the finish 12' of the preform 10'. In this case, the outer diameter "D" of the insert 26 matches the outer finish diameter "B". Preferably, the inserts 26 have a width "X" equal to half the width "W" of the finish 12 or the finish 12'.

The insert 26 is attached to the finish 12 by a layer 28 of hardened molten plastic formed between the insert 26 and the finish 12 to bond the insert 26 and finish 12 without requiring separate adhesives. A preferred method of applying the insert 26 to the finish 12 is by spin welding the insert 26 to the finish 12. The friction associated with spin welding temporarily creates a layer of molten plastic where the insert 26 abuts the finish 12. After the layer 28 hardens, the insert 26 is bonded to the finish 12. However, other methods to effect attachment may be used. For instance, the insert 26 can be press fit on the finish 12; heat such as by infrared or microwave energy can be applied to bond the insert 26 to the finish 12; or adhesives can be used to bond the insert 26 to the finish 12.

From a theoretical standpoint, the insert 26 cooperates with the finish to enable it to resist deformation due to the greater rigidity of the insert material relative to the finish material and due to its greater flexural modulus, Tg, and heat distortion values.

In view of the foregoing, it should be apparent that the present invention now provides a blow molded container formed from a preform having a reinforced finish which can be used in hot-fill processes wherein product fill temperatures approaching 210° F. are common. The reinforced finish provides superior stability without incurring undue manufacturing expense.

While a preferred embodiment of the present invention has been described in detail, various modifications, alterations, and changes may be made without departing from the spirit and the scope of the present invention as defined in the appended claims.

I claim:

1. In a blow-molded container having a reinforced finish capable of maintaining stability during and after hot-fill processing, the finish having a top surface, an inner peripheral surface extending from said top surface defining an inner finish diameter, and an outer peripheral surface extending from said top surface defining an outer finish diameter, the outer peripheral surface having a thread for cooperating with a cap to seal the container, the finish having a width at said top surface defined by a distance from the inner peripheral surface to the outer peripheral surface, the improvement comprising an insert permanently attached to the finish and forming a portion of the top surface of the finish, said insert being ring-shaped, made from plastic having greater rigidity than the finish, and positioned entirely above the threads, said insert having an inner diameter at least as large as the inner finish diameter and an outer diameter no greater than the outer finish diameter, and said insert having a width between said inner diameter and said outer diameter which is less than the width of the finish at said top surface.

2. An improved blow-molded container according to claim 1, wherein said insert forms a portion of the inner peripheral surface of the finish such that said inner diameter of said insert matches the inner finish diameter.

3. An improved blow-molded container according to claim 2, further comprising a layer of plastic between said insert and the finish, said layer being a mixture of the plastic of the finish and the insert, for connecting said insert to said finish, said layer extending along a bottom portion of said insert and along a side portion of said insert which forms said outer diameter of said insert.

4. An improved blow-molded container according to claim 1, wherein said insert forms a portion of the outer peripheral surface of the finish such that said outer diameter of said insert matches the outer finish diameter.

5. An improved blow-molded container according to claim 4, further comprising a layer of plastic between said insert and the finish, said layer being a mixture of the plastic of the finish and the insert, for connecting said insert to said finish, said layer extending along a bottom portion of said insert and along a side portion of said insert which forms said inner diameter of said insert.

6. An improved blow-molded container according to claim 1, wherein said insert width is approximately equal to half of said finish width at said top surface.

7. An improved blow-molded container according to claim 1, wherein the container is made of PET, and wherein said rigid plastic material is selected from the group consisting of crystallized PET, polycarbonate, and U-Polymer.

8. An improved blow-molded container according to claim 1, wherein said insert is rectangular in vertical cross-section, and whereby the reinforced finish is capable of maintaining stability during and after hot-fill processing involving fill temperatures approaching 210° F.

9. In a preform used to make a blow-molded container having a reinforced finish capable of maintaining stability during and after hot-fill processing, the finish having a top surface, an inner peripheral surface extending from said top surface defining an inner finish diameter, and an outer peripheral surface extending from said top surface defining an outer finish diameter, the outer peripheral surface having a thread for cooperating with a cap to seal the container, the finish having a width at said top surface defined by a distance from the inner peripheral surface to the outer peripheral surface, the improvement comprising an insert permanently attached to the finish and forming a portion of the top surface of the finish, said insert being ring-shaped, made from plastic having greater rigidity than the finish, and positioned entirely above the threads, said insert having an inner diameter at least as large as the inner finish diameter and an outer diameter no greater than the outer finish diameter, and said insert having a width between said inner diameter and said outer diameter which is less than the width of the finish at said top surface.

10. An improved preform according to claim 9, wherein said insert forms a portion of the inner peripheral surface of the finish such that said inner diameter of said insert matches the inner finish diameter.

11. An improved preform according to claim 10, further comprising a layer of plastic between said insert and the finish, said layer being a mixture of the plastic of the finish and the insert, for connecting said insert to said finish, said layer extending along a bottom portion of said insert and along a side portion of said insert which forms said outer diameter of said insert.

12. An improved preform according to claim 9, wherein said insert forms a portion of the outer peripheral surface of the finish such that said outer diameter of said insert matches the outer finish diameter.

13. An improved preform according to claim 12, further comprising a layer of plastic between said insert and the finish, said layer being a mixture of the plastic of the finish and the insert, for connecting said insert to said finish, said layer extending along a bottom portion of said insert and along a side portion of said insert which forms said inner diameter of said insert.

14. An improved preform according to claim 9, wherein said insert width is approximately equal to half of said finish width at said top surface.

15. An improved preform according to claim 9, wherein the preform is made of PET, and wherein said rigid plastic material is selected from the group consisting of crystallized PET, polycarbonate, and U-Polymer.

16. An improved preform according to claim 9, wherein said insert is rectangular in vertical cross-section, and whereby the reinforced finish is capable of maintaining stability during and after hot-fill processing involving fill temperatures approaching 210° F.

* * * * *